Dec. 18, 1962   L. F. MUNSINGER   3,068,605
COMBINATION SPREADER AND WEIGHT RELEASE ASSEMBLY
Filed Oct. 26, 1959

INVENTOR.
LYLE F. MUNSINGER
BY Eugene M. Eckelman
ATTORNEY

United States Patent Office 3,068,605
Patented Dec. 18, 1962

3,068,605
COMBINATION SPREADER AND WEIGHT
RELEASE ASSEMBLY
Lyle F. Munsinger, 12025 NE. Hancock,
Portland, Oreg.
Filed Oct. 26, 1959, Ser. No. 848,592
1 Claim. (Cl. 43—42.74)

This invention relates to new and useful improvements in fishing tackle, and more particularly is concerned with a spreader device.

A primary object of the present invention is to provide a spreader device utilizing a weight release mechanism as a part thereof.

More particularly, it is an object of the present invention to provide an improved spreader which maintains a weight line and a fish hook line in non-snarling relation and which also has means permitting the automatic detachment of a weight therefrom when a fish exerts a pull on the hook.

Another object is to provide a spreader device having an improved weight release mechanism incorporated therein.

Devices commonly referred to as spreaders are used in fishing tackle arrangements for the purpose of maintaining a fish hook line and a weight line apart from each other so that these two lines will not snarl while casting and while in the water. In brief, the present invention comprises such a spreader having a weight release mechanism forming a part thereof. For accomplishing the intended purpose, the spreader has a first stem or arm attached to the weight release mechanism and a second stem or arm with means for threadedly receiving the weight line from the release mechanism for maintaining the weight line away from the fish hook line. Means are provided for attaching the spreader to the pole line and the fish hook line.

The invention will be better understood and additional objects and advantages will become apparent from the following description. Various changes may be made in the details of construction without departing from the spirit or scope of the invention as defined in the appended claims.

Figure 1:
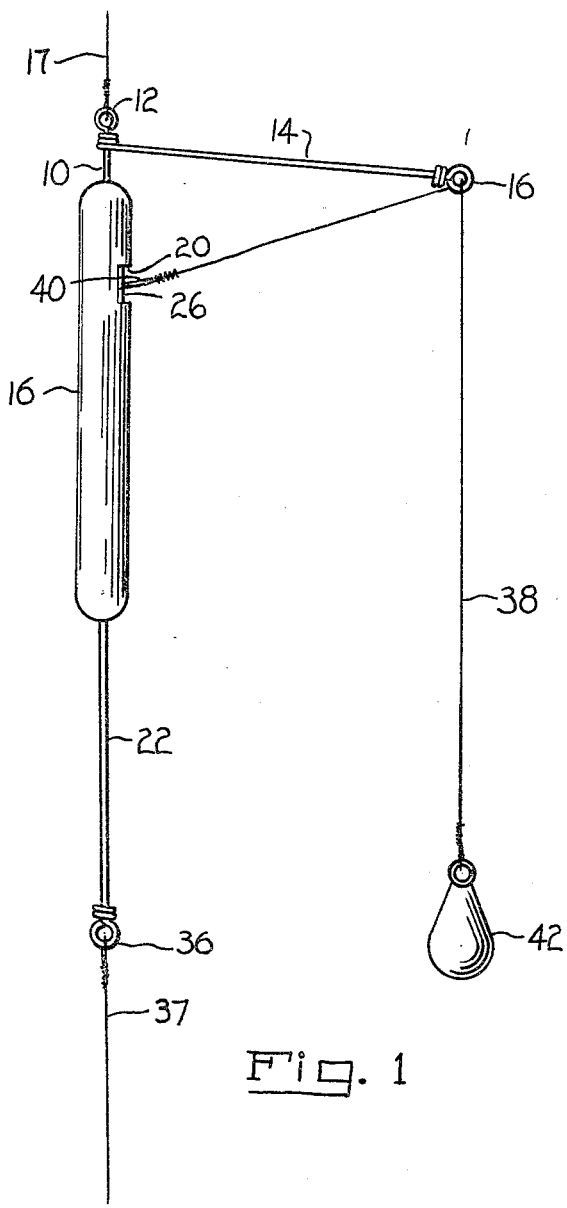
FIGURE 1 is an elevational view of the spreader and its weight release mechanism.
Figure 2:
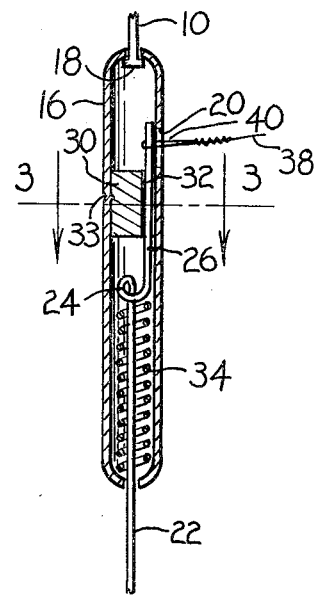
FIGURE 2 is a longitudinal sectional view of the weight release portion.
Figure 3:
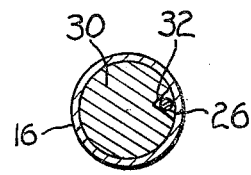
FIGURE 3 is a sectional view taken on the line 3—3 of FIGURE 2.

Referring in particular to the drawings, the spreader comprises an upper stem or arm 10 having an eye or loop 12 and having a laterally extending arm 14 terminating in an eye or loop 16. Loop 12 is attached to a pole line 17. The lower portion of stem 10 extends through the upper end of a cylindrical, weight release casing 16, and is attached to such casing by means of an enlargement 18 on the end of the stem confined within the casing, FIGURE 2, although it is to be understood that any suitable connection, preferably with swivels therein, may be provided between casing 16 and stem 10. A window 20 is provided in the wall of the casing 16 adjacent the upper end thereof for a purpose to be described.

Weight release mechanism 16 slidably receives a latch or retainer stem 22 through its bottom end, the casing being suitably apertured at its lower end for receiving such stem. A loop 24 is provided in the latch stem 22 intermediate its ends for the purpose of offsetting the upper portion thereof from the lower portion, the upper portion comprising a latch finger 26 controlling the release of a weight line from the spreader. By such offset arrangement, it will be apparent that the latch finger 26 is disposed in a plane closely adjacent the wall of the casing and consequently close to the window 20 for efficiently performing its intended use, to be described. Latch finger 26 is guided for its slidable movement in the casing 16 by means of a guide block 30 having a longitudinal groove 32 which receives the finger 26. Block 30 is securely mounted interiorly of the casing by suitable means such as by crimping the casing thereon, a crimped portion being designated by numeral 33.

Latch stem 22 is urged upwardly by means of a compression spring 34 sleeved thereon and interposed between the lower end of the casing and the loop 24. Stem 22 has an eye or loop 36 on its lower end for attachment to a leader 37 for the hook.

In the use of the present device the pole line 17 is attached to eye 12 and the fish hook leader or line is attached to eye 36. A weight line 38, having a loop 40 on one end and a weight 42 on the opposite end is threaded through the eye 16 on lateral arm 14, the loop 40 being hooked over the latch finger 26. Engagement of the loop 40 over the finger 26 is accomplished by first manually sliding the stem 22 downwardly sufficiently to bring the upper end of finger 26 below the window 20. With the loop 40 held in the path of travel of finger 26, the latter will pass through such loop upon release of the stem 22.

Spring 34 returns the stem to its rest position wherein the upper end of finger 26 is disposed above the upper edge of the window 20 to maintain the weight line loop 40 thereon.

It will be seen that by the structure provided the finger 26 of the stem 22 is guided in a true path along the inner surface of the casing by the block 30, whereby the loop 40 can in no way be accidentally displaced from the finger unless such finger is moved downwardly, as when a fish exerts a pull on the line 37.

The present spreader arrangement thus provides an efficient means for releasing the weight, thus permitting the fishing operation to be accomplished without the drag of the weight through the water. At the same time, by means of the arrangement of parts and the threading of the weight line through one of the spreader arms, the present spreader maintains the weight line and the fish line apart in non-snarling relationship. More particularly, it is apparent that a straight through pull is maintained on the device, i.e., from the fish hook line 37 to the pole line 17, thereby holding the arm 14 at substantially right angles to line 17. Arm 14 may be of any desired length, depending upon the length of the weight line and other factors.

Having now described my invention and in what manner the same may be used, what I claim as new and desire to protect by Letters Patent is:

A combination spreader and weight release assembly comprising first and second integral divergent arms, said first arm having means at one end thereof adapted for connection to a pole line, a weight release casing suspended from the other end of said first arm, said casing having a side opening and a bottom opening therein, a stationary guide member in said casing, said guide member having a longitudinally disposed notch therein immediately adjacent the inner surface of said casing, a latch stem slidably mounted in said casing having an offset finger engageable in said notch and arranged for movement across said opening, said stem projecting from said casing through said bottom opening and having means on its projecting end adapted for connection to a fish hook line, and spring means on said stem interiorly of said casing for urging the latter inwardly of the casing, said second arm having a loop on its outer end adapted to slidably receive a weight line engaged with said stem.

References Cited in the file of this patent

UNITED STATES PATENTS

| | | |
|---|---|---|
| 779,286 | Kramer | Jan. 3, 1905 |
| 1,296,370 | Darling | Mar. 4, 1919 |
| 1,720,287 | Moore | July 9, 1929 |
| 2,359,588 | Shea | Oct. 3, 1944 |
| 2,392,335 | Morrill | Jan. 8, 1946 |
| 2,488,475 | Merritt | Nov. 15, 1949 |